Figure 1:
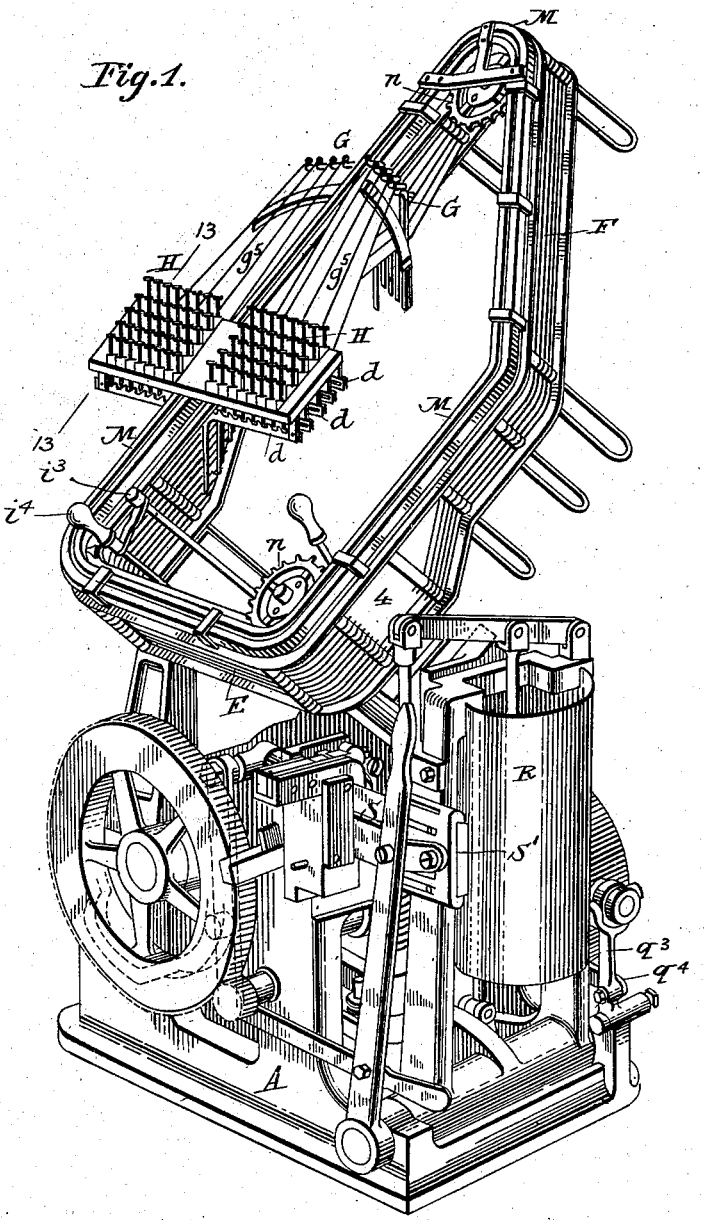

No. 741,957. PATENTED OCT. 20, 1903.
P. T. DODGE.
LINOTYPE MACHINE.
APPLICATION FILED MAR. 14, 1903.
NO MODEL. 17 SHEETS—SHEET 1.

WITNESSES.
INVENTOR.

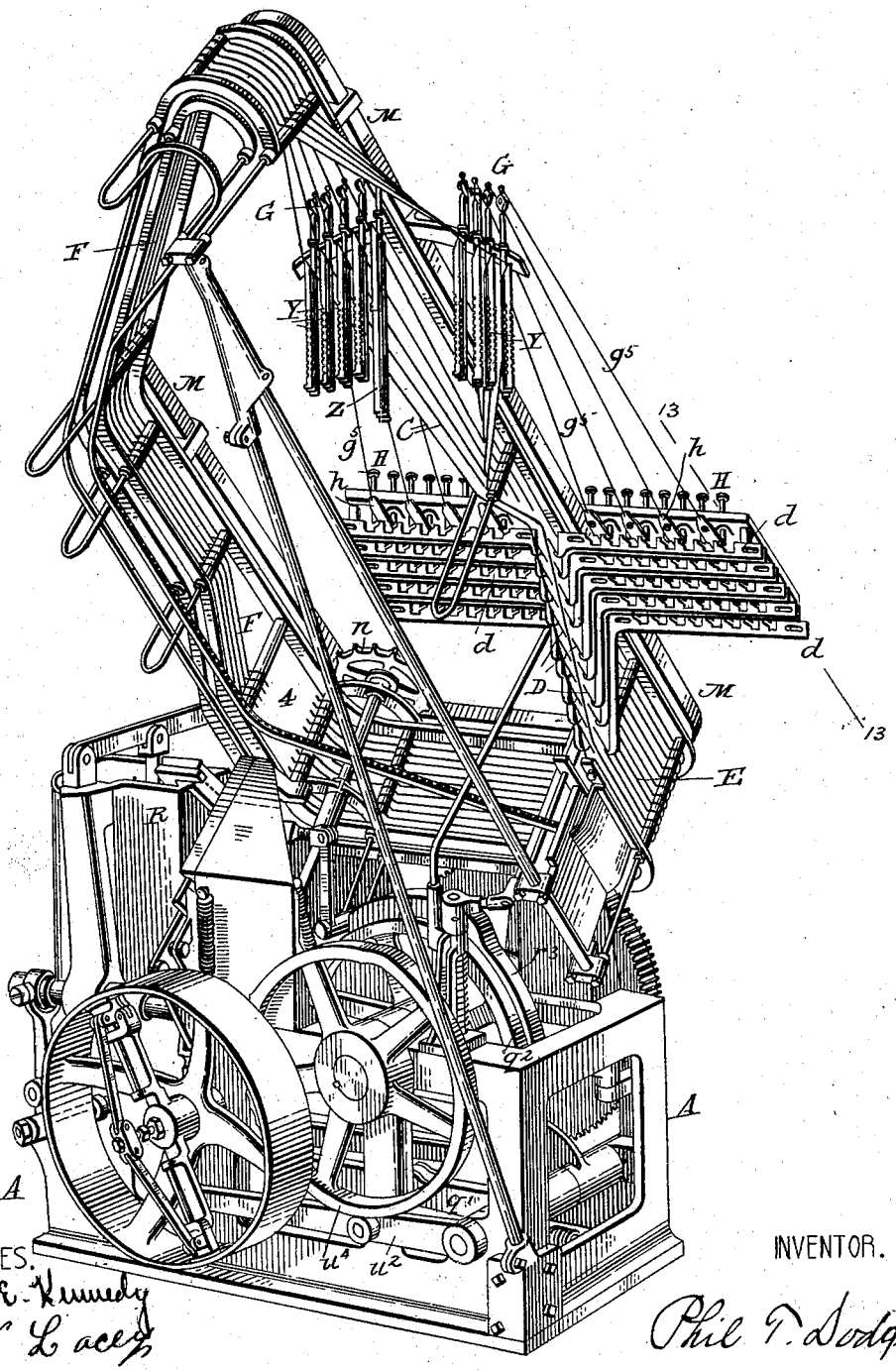

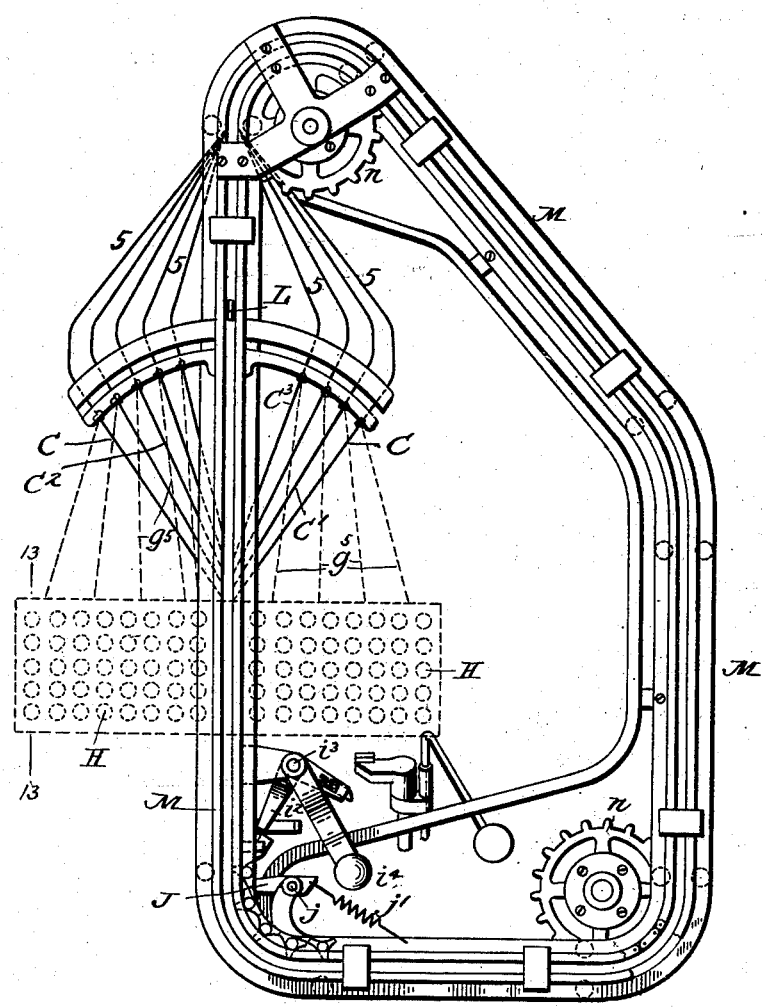

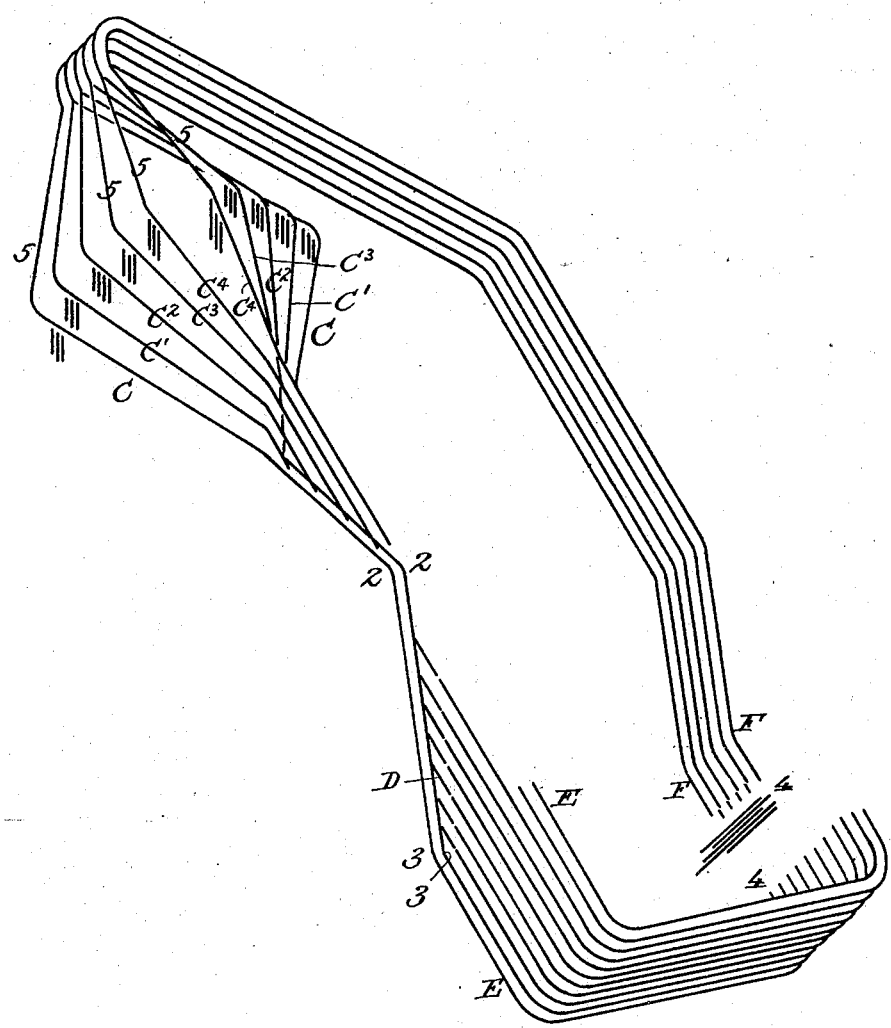

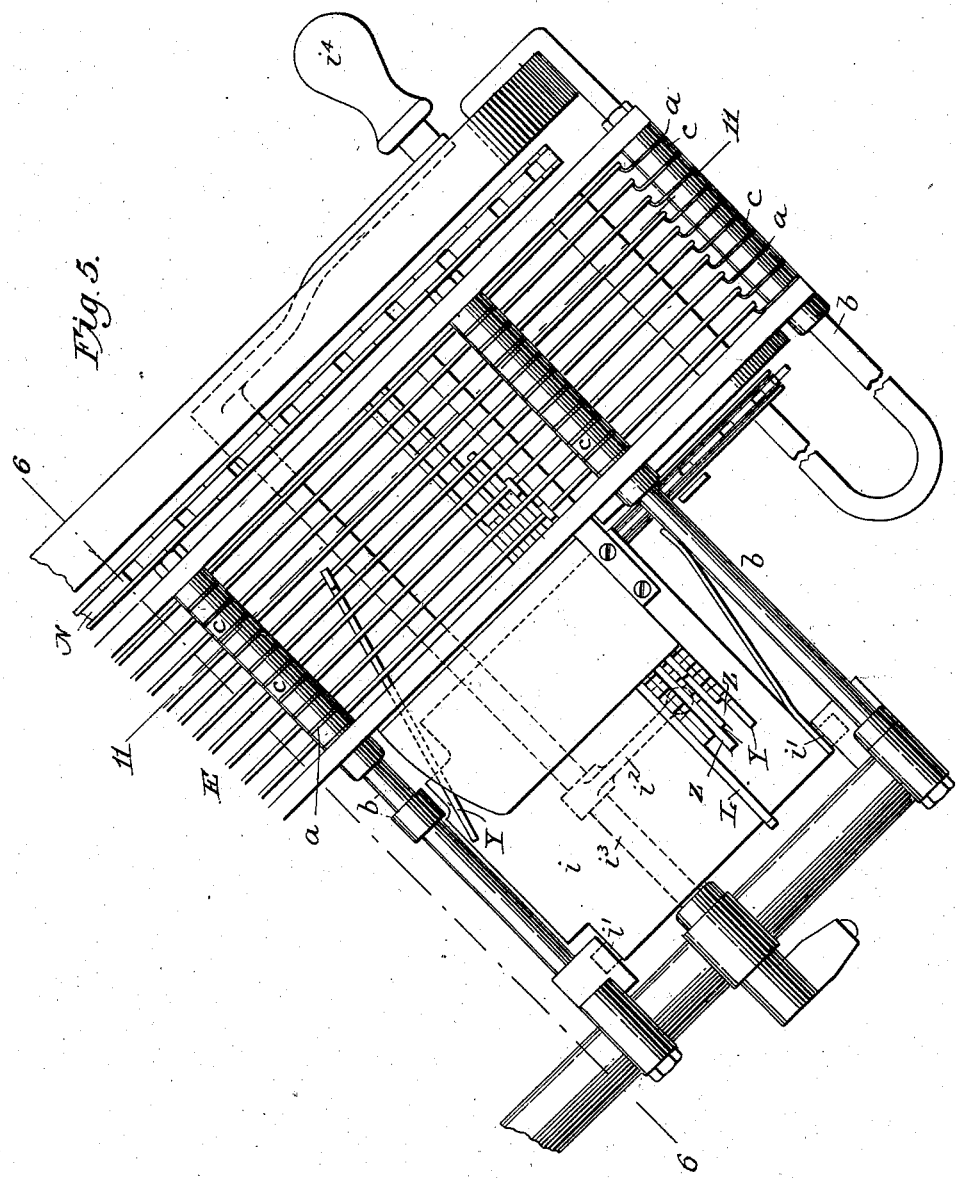

No. 741,957. PATENTED OCT. 20, 1903.
P. T. DODGE.
LINOTYPE MACHINE.
APPLICATION FILED MAR. 14, 1903.
NO MODEL. 17 SHEETS—SHEET 6.
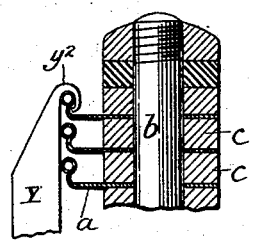
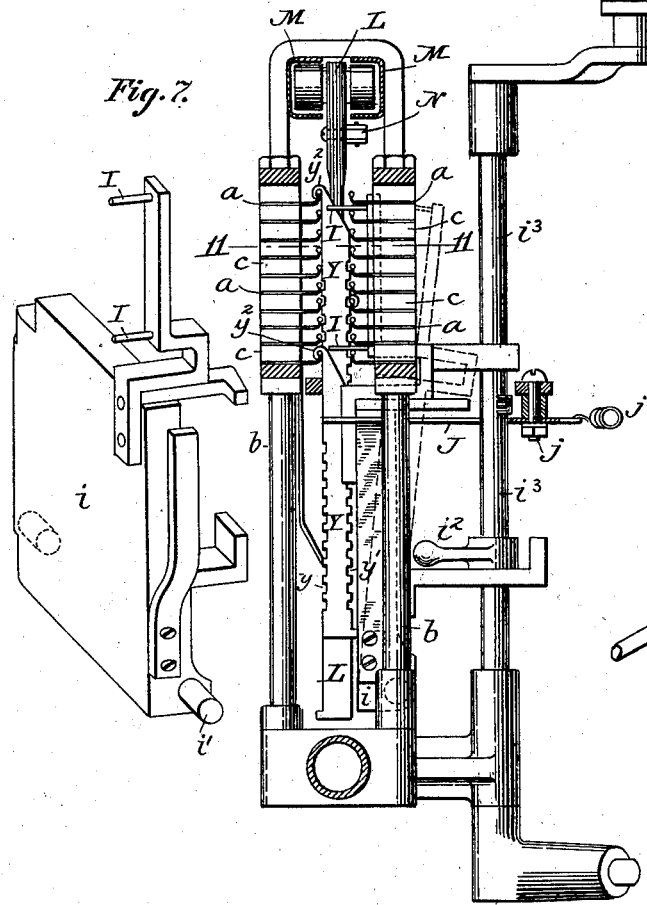
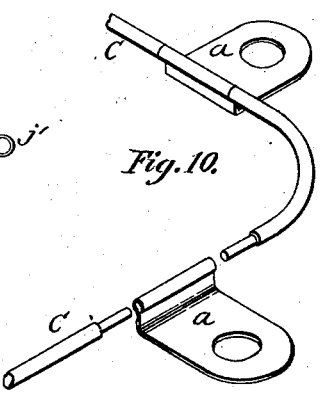
WITNESSES.
A. W. E. Kennedy
J. W. Lacey
INVENTOR.
Phil. T. Dodge No. 741,957. PATENTED OCT. 20, 1903.
P. T. DODGE.
LINOTYPE MACHINE.
APPLICATION FILED MAR. 14, 1903.
NO MODEL. 17 SHEETS—SHEET 7.

on line 11-11

WITNESSES. INVENTOR.
A. M. E. Kennedy Phil. T. Dodge
J. W. Lacey

No. 741,957. PATENTED OCT. 20, 1903.
P. T. DODGE.
LINOTYPE MACHINE.
APPLICATION FILED MAR. 14, 1903.
NO MODEL. 17 SHEETS—SHEET 10.
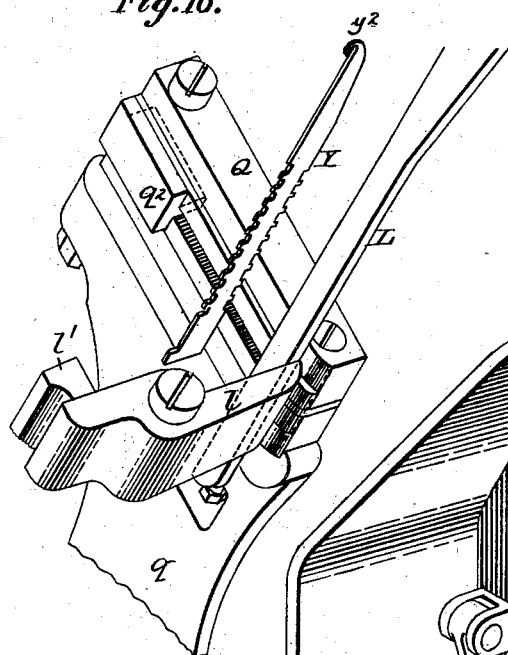
Fig. 16.
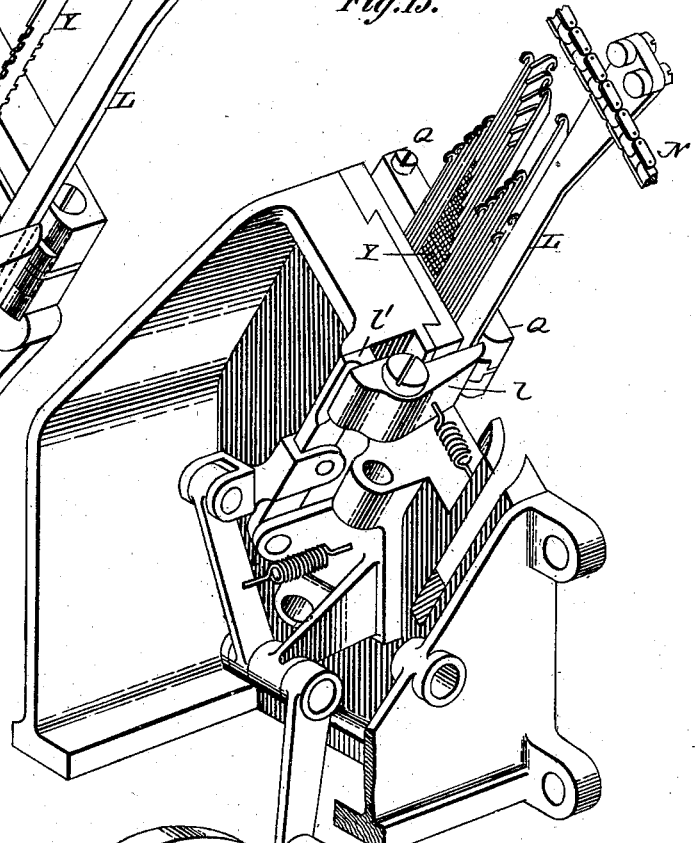
Fig. 15.
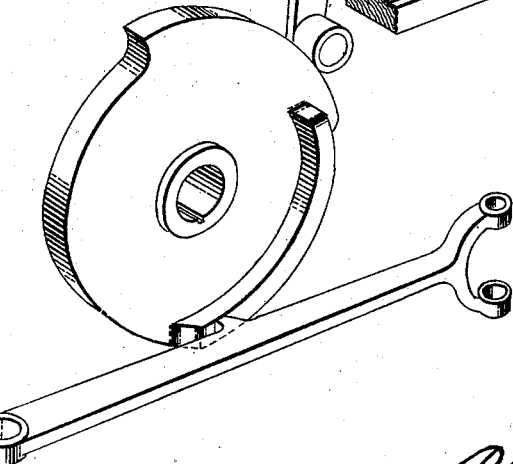
WITNESSES. INVENTOR.

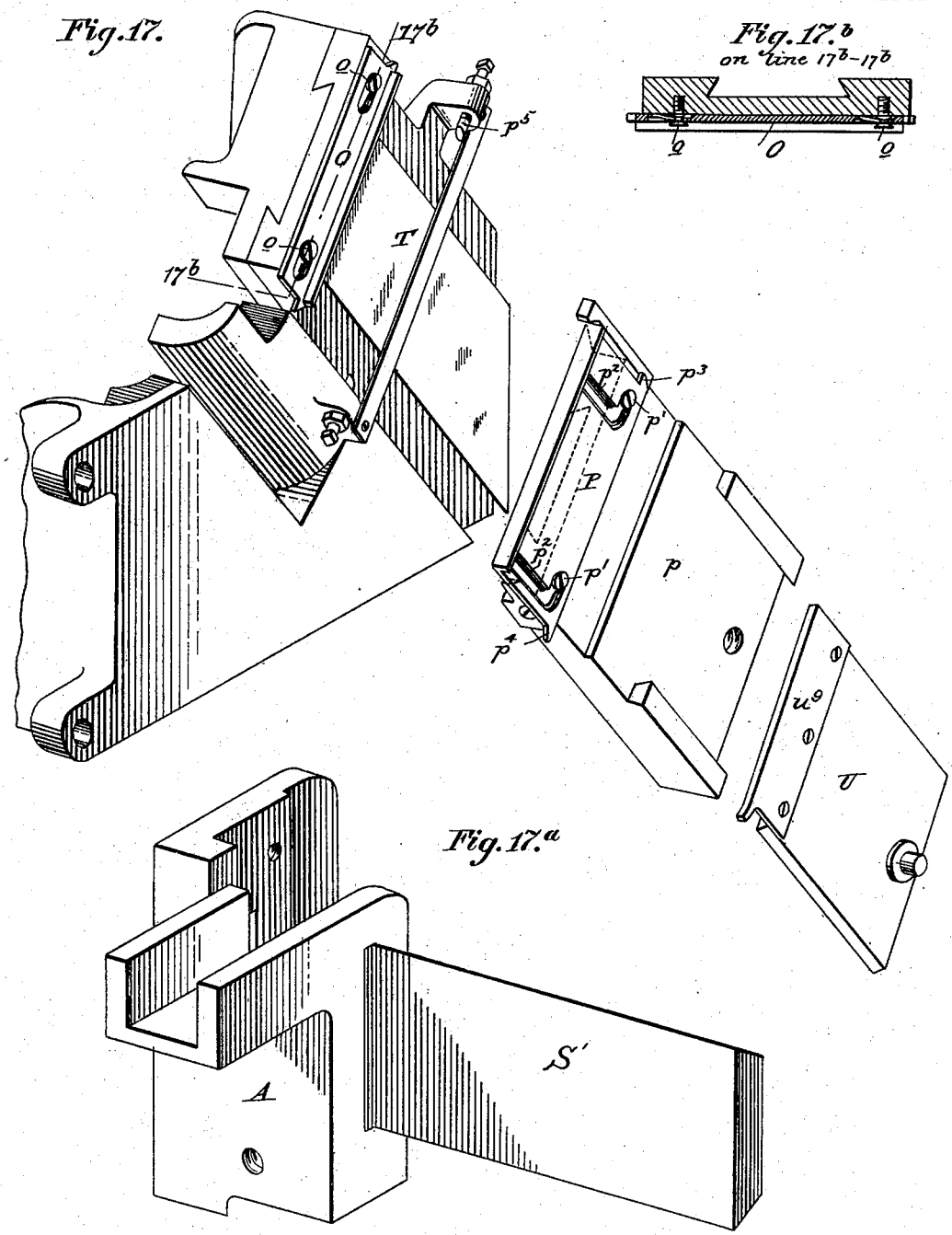

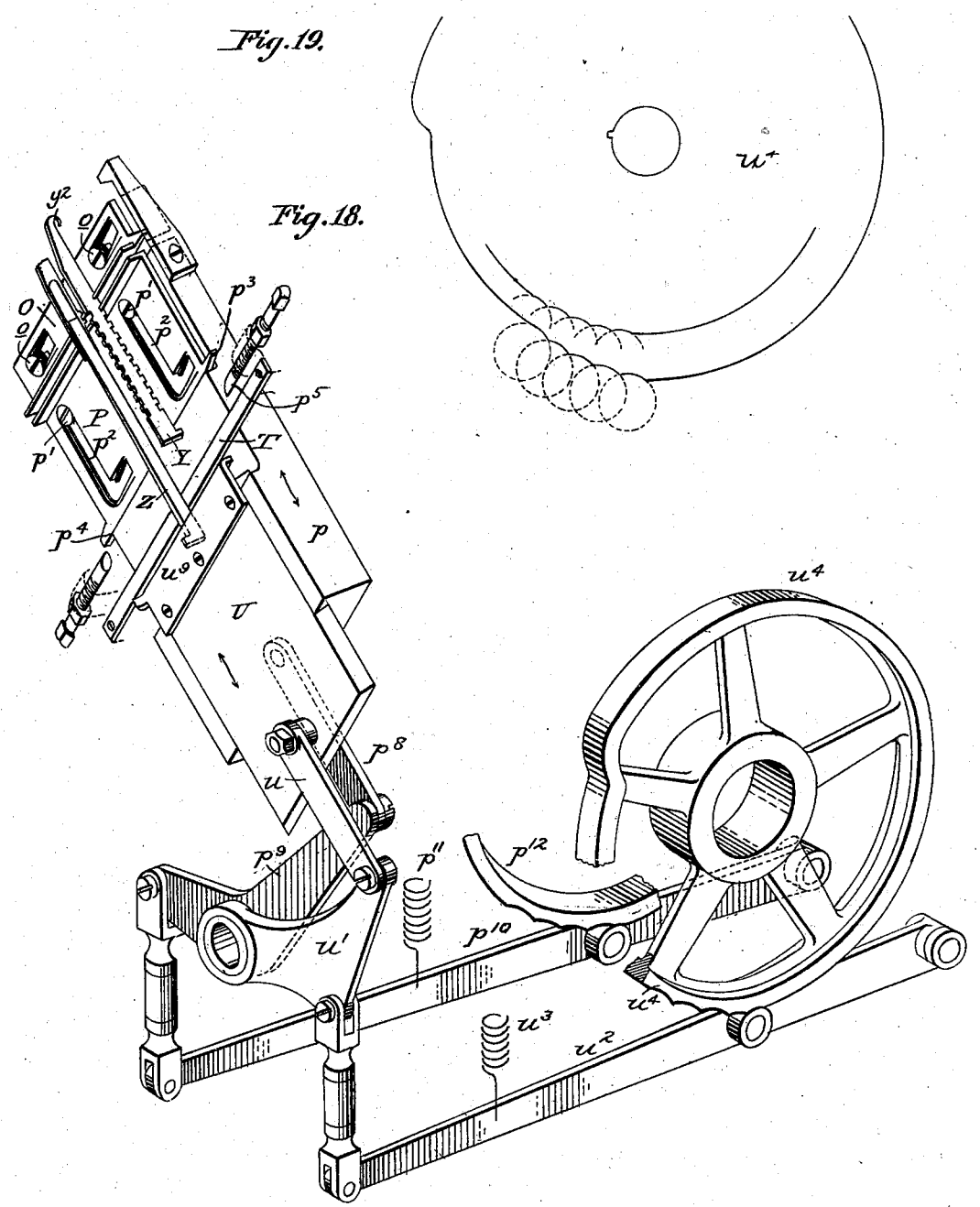

No. 741,957. PATENTED OCT. 20, 1903.
P. T. DODGE.
LINOTYPE MACHINE.
APPLICATION FILED MAR. 14, 1903.
NO MODEL. 17 SHEETS—SHEET 13.
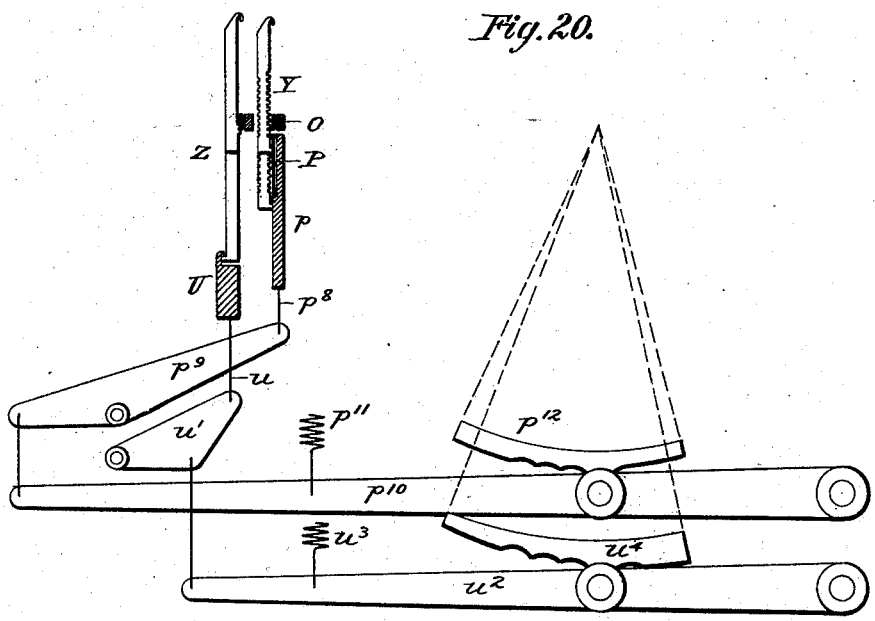
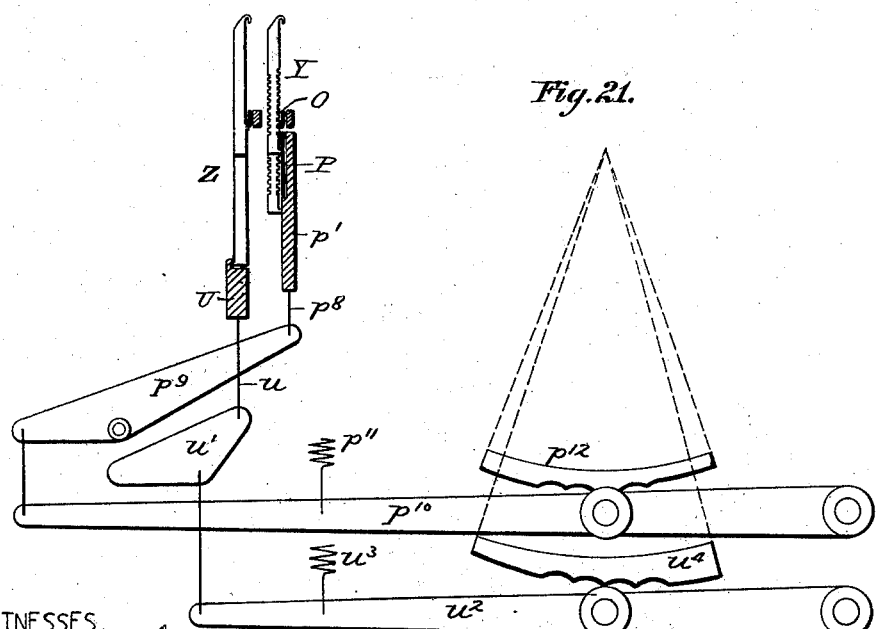
WITNESSES.
INVENTOR.

No. 741,957. PATENTED OCT. 20, 1903.
P. T. DODGE.
LINOTYPE MACHINE.
APPLICATION FILED MAR. 14, 1903.
NO MODEL. 17 SHEETS—SHEET 14.
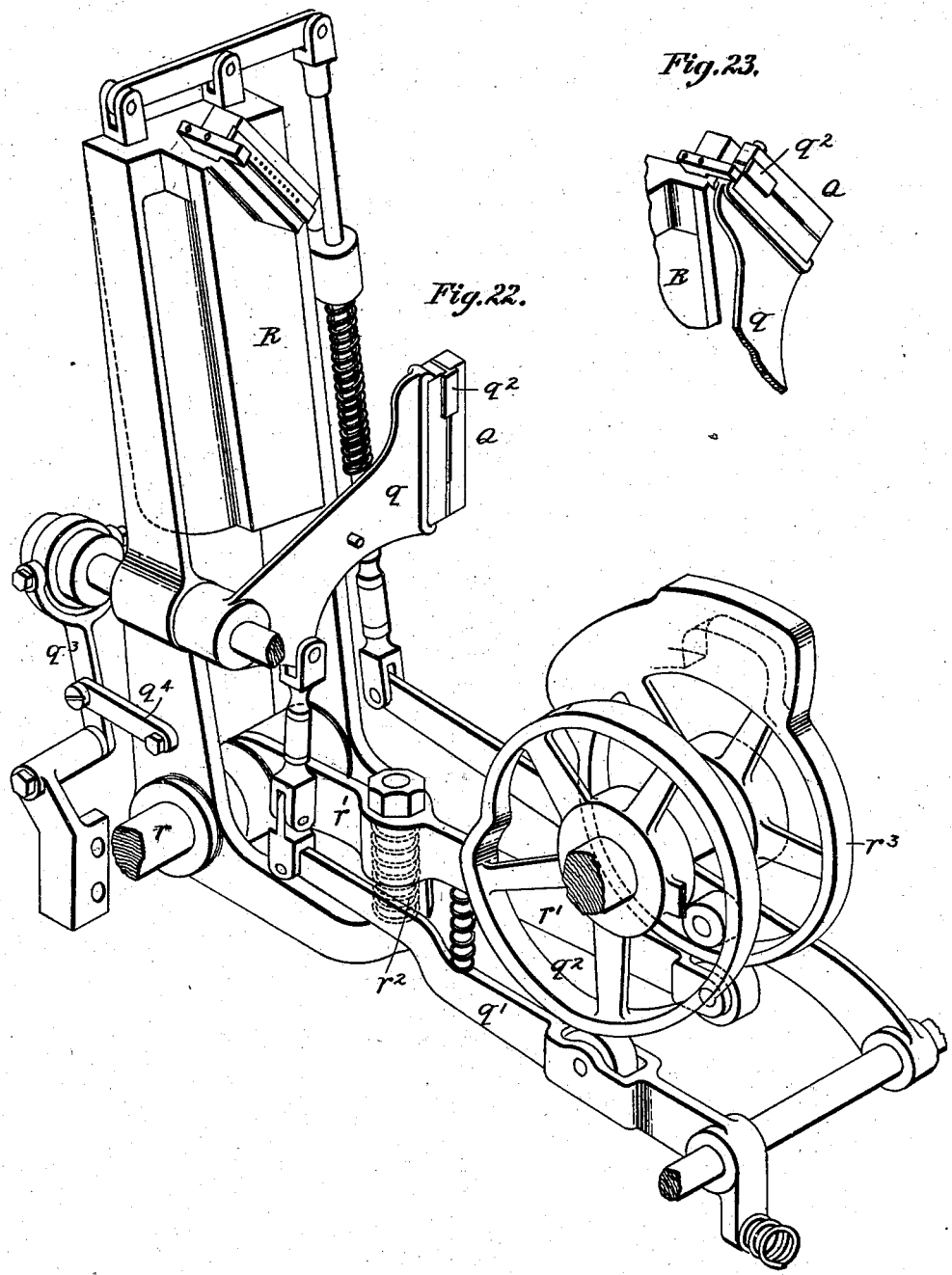
WITNESSES.
INVENTOR.

No. 741,957. PATENTED OCT. 20, 1903.
P. T. DODGE.
LINOTYPE MACHINE.
APPLICATION FILED MAR. 14, 1903.
NO MODEL. 17 SHEETS—SHEET 15.

WITNESSES
INVENTOR.

No. 741,957. PATENTED OCT. 20, 1903.
P. T. DODGE.
LINOTYPE MACHINE.
APPLICATION FILED MAR. 14, 1903.
NO MODEL. 17 SHEETS—SHEET 16.

WITNESSES. INVENTOR.

No. 741,957. PATENTED OCT. 20, 1903.
P. T. DODGE.
LINOTYPE MACHINE.
APPLICATION FILED MAR. 14, 1903.
NO MODEL. 17 SHEETS—SHEET 17.

WITNESSES:
INVENTOR

No. 741,957. Patented October 20, 1903.

UNITED STATES PATENT OFFICE.

PHILIP T. DODGE, OF NEW YORK, N. Y., ASSIGNOR TO THE MERGENTHALER LINOTYPE COMPANY, A CORPORATION OF NEW YORK.

LINOTYPE-MACHINE.

SPECIFICATION forming part of Letters Patent No. 741,957, dated October 20, 1903.

Application filed March 14, 1903. Serial No. 147,779. (No model.)

*To all whom it may concern:*

Be it known that I, PHILIP T. DODGE, of New York, county of New York, and State of New York, have invented a new and useful Improvement in Linotype-Machines, of which the following is a specification.

My invention has reference to that class of linotype-machines in which a series of circulating matrices are employed, each matrix having in its edge a number of characters used one at a time. In this class of machines the composition of a line of characters is effected by selecting and assembling the matrices bearing the required characters and by adjusting the matrices endwise in relation to each other, so as to bring the selected characters, one on each matrix, into a common line.

The aim of my invention is to provide a machine in which the matrices are suspended from and arranged to travel on stationary inclined guides, which diverge at certain points in their length for the purpose of distributing the matrices and again converge for the purpose of assembling or bringing together the selected matrices. In this manner I am enabled to produce a machine combining the advantages of those machines in which single-letter matrices are suspended from and travel on fixed guides.

Figure 11:
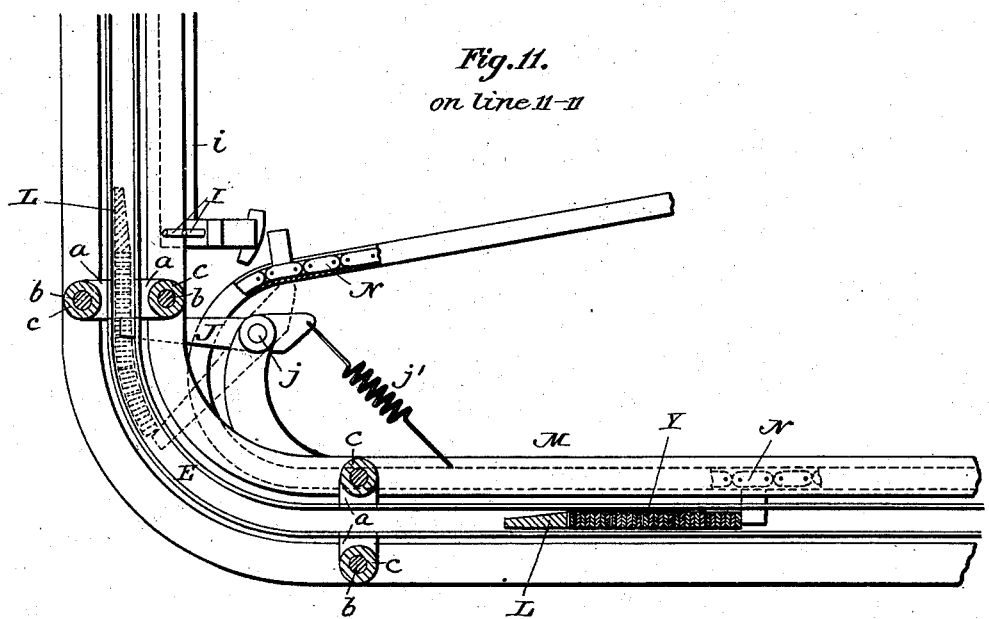
Figure 12:
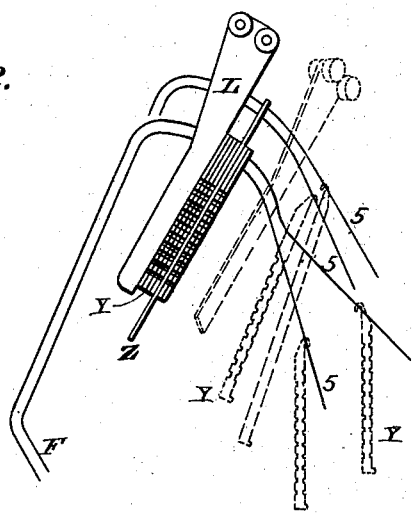
Figure 13:
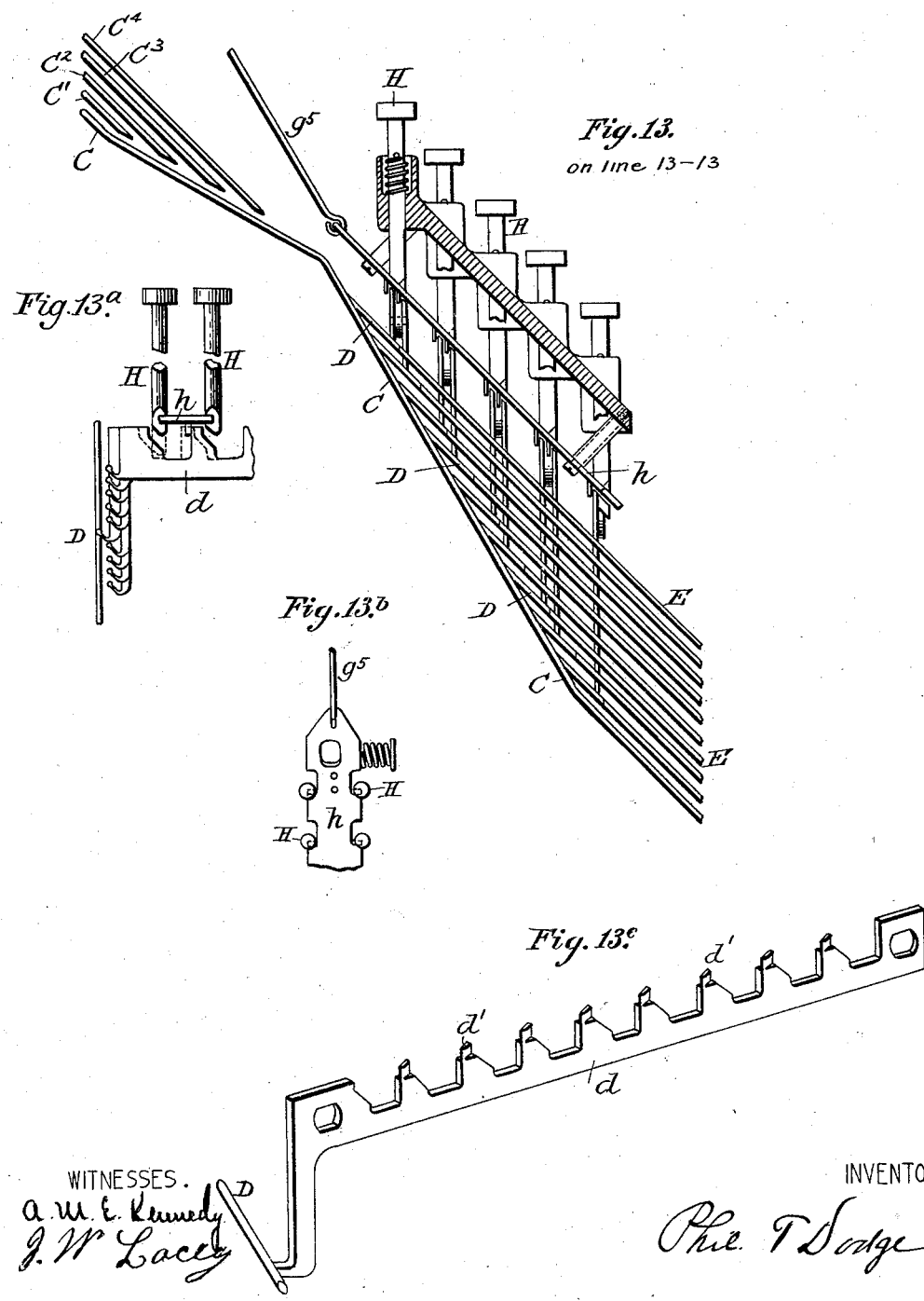
Figure 14:
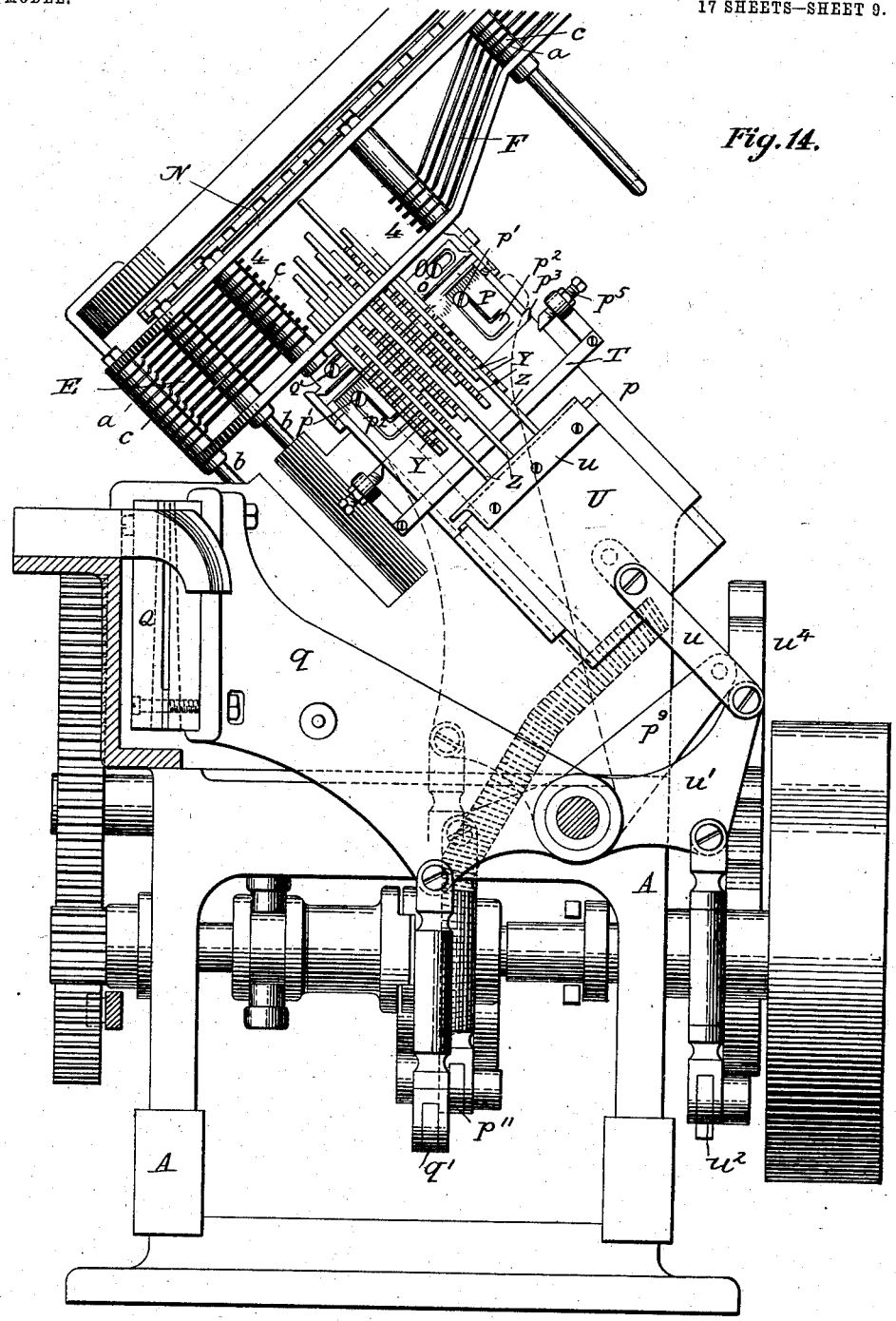
Figure 24:
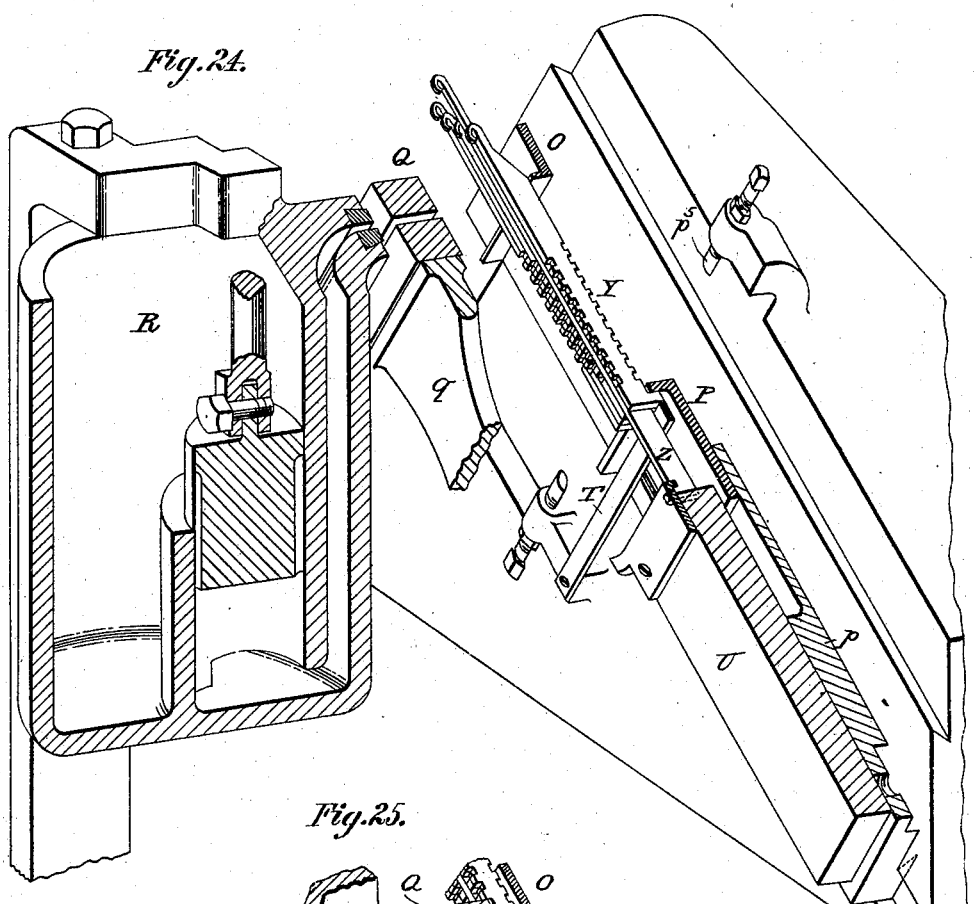
Figure 25:
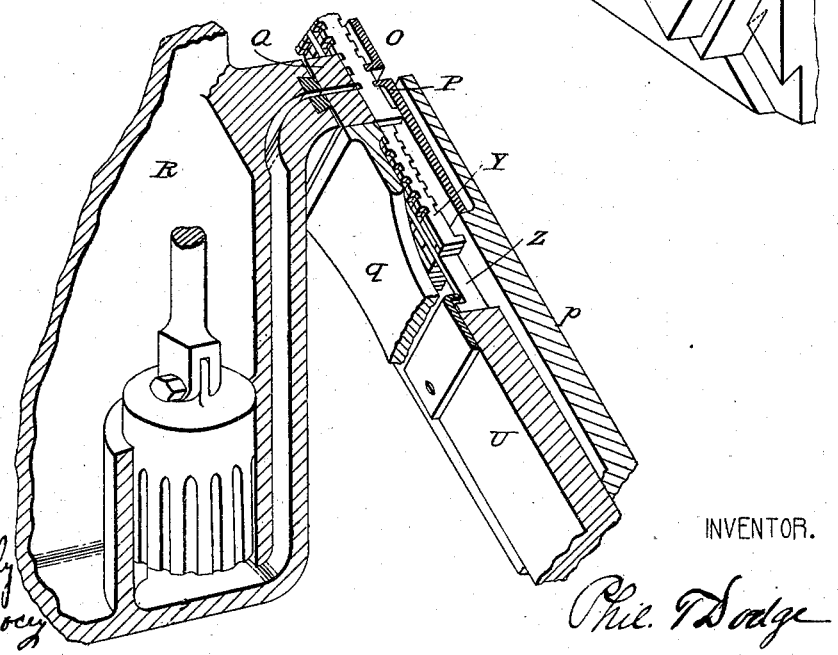
Figure 26:
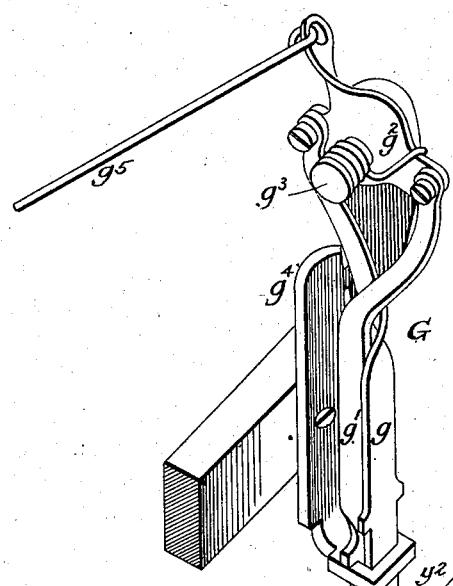
Figure 28:
Figure 27:
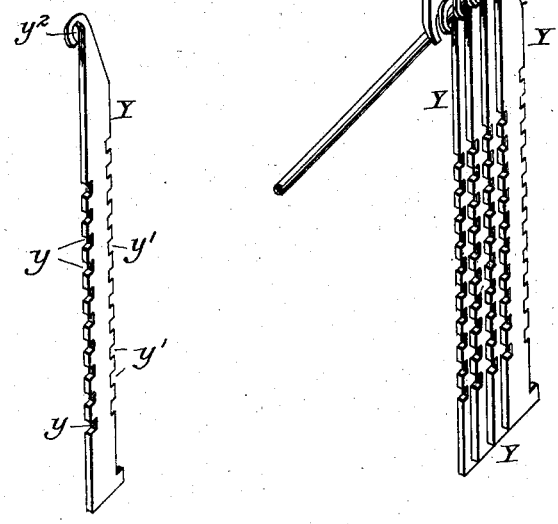
Figure 29:
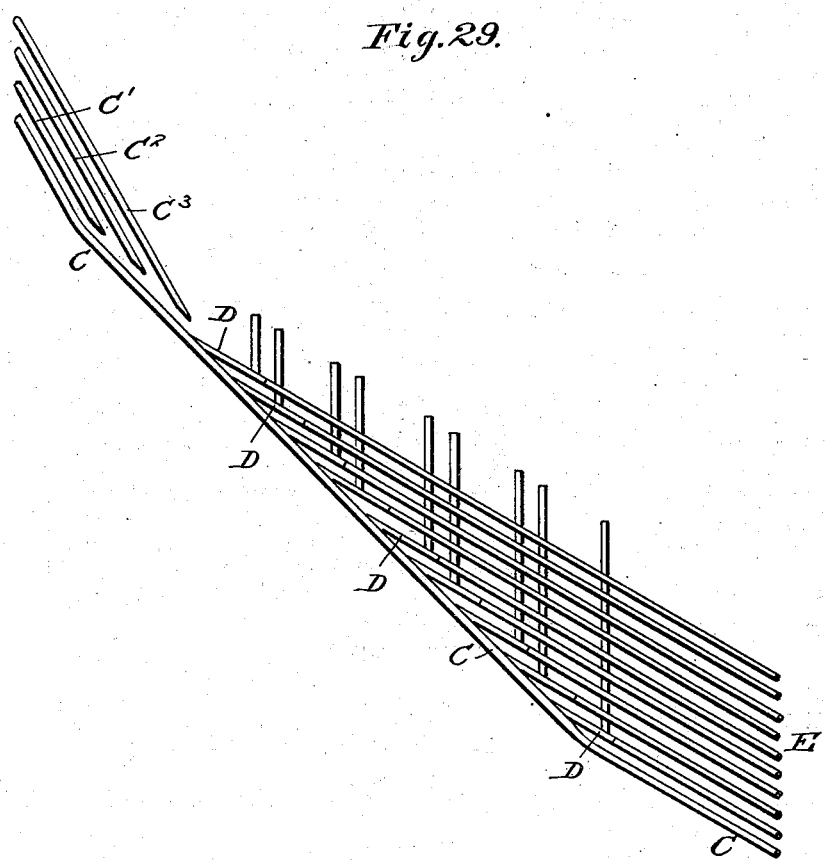

Referring to the drawings, Figure 1 is a perspective view of the machine from the front. Fig. 2 is a similar view from the rear. Fig. 3 is a top plan view illustrating the principal parts of the framework and guides. Fig. 4 is a perspective view showing the relations of the inclined guides on which the matrices hang. Fig. 5 is a side elevation of the lower end showing the matrix-assembling mechanism. Fig. 6 is a cross-section on the line 6 6, Fig. 5. Figs. 7, 8, 9, and 10 are views of details hereinafter described. Fig. 11 is a horizontal cross-section on the correspondingly-numbered line, Figs. 5 and 6, illustrating the action of the assembling and transferring devices. Fig. 12 is a perspective view of parts at the upper rear end of the machine, showing the manner in which the matrices are distributed. Fig. 13 is a vertical section on the correspondingly-numbered line of Figs. 1, 2, and 3. Figs. $13^a$, $13^b$, and $13^c$ are detail views of parts shown in the preceding figure. Fig. 14 is a side elevation looking from the left, showing more particularly the parts for confining and justifying the composed line in the casting position, the mold, and the knife for trimming the base of the slug. Fig. 15 is a perspective view of the devices for confining the matrix-line in the casting position. Fig. 16 is a perspective view showing more particularly the mold and the devices for confining the matrices in front of the same. Fig. 17 is a perspective view showing separated from each other the parts for confining and justifying the line. Fig. $17^a$ is a perspective view of the support for the ejector and the trimming-knives, this support being a rigid part of the main frame. Fig. $17^b$ is a cross-section on the correspondingly-numbered line of Fig. 17. Fig. 18 is a perspective view illustrating the mechanism for alining and adjusting the matrices in the casting position. Fig. 19 is a diagram of the justifying and alining cams. Figs. 20 and 21 are diagrammatic views illustrating the action of the matrix alining and justifying devices. Fig. 22 is a perspective view of the melting-pot, the mold, and their operating connections, the mold being in position to permit the ejection of the slug. Fig. 23 is a perspective view showing the mold in casting relation to the mouth of the pot. Fig. 24 is a perspective view, partly in section, illustrating the relation of the matrix-line, mold, pot, and adjacent parts just prior to their being locked together. Fig. 25 is a similar view showing the parts locked together in the casting position. Fig. 26 is a perspective view of one of the escapements releasing the matrices. Fig. 27 is a perspective view of one of the matrices. Fig. 28 is a perspective view of one of the spacers. Fig. 29 is a side elevation illustrating the relations of the inclined guides.

I employ as the basis of my machine a series of matrices Y, such as shown in Fig. 27, and a series of expansible spacers or justifiers Z, such as shown in Fig. 28. Each of the matrices consists of a bar, of brass or similar material, having in one edge a number of different intaglio characters or matrices proper, $y$, in the opposite edge a series of alining notches $y'$, and at the top an eye or hook $y^2$, by which the matrix is suspended from the stationary guides in the main frame.

I employ any suitable number of matrices, usually from one hundred to three hundred. They are divided into groups. All the matrices in one group are of the same length and have in one edge ten different characters or matrices proper, $y$, of equal width. The matrices belonging to different groups contain different characters and are made of different lengths. If the machine is adapted to produce ninety characters, as usual, there will be nine groups of matrices, those of each group containing ten characters. They are made of uniform size and width at their lower ends. The difference in length is due to their elongation at the upper end a greater or less distance beyond the characters. This variation in length is utilized in effecting the proper distribution of matrices of the different groups to their sustaining wires or guides.

When a line is to be composed for use at the mold, it is necessary, first, to select in their proper order matrices or matrix-bars bearing the required characters in the order in which the characters are to appear; second, to assemble these matrices in line side by side, and, third, to adjust them endwise in relation to each other, so that the designated characters or letters (one in each matrix) will appear in a common horizontal line.

The spacers $Z$ consist each of an upper member $z$, having a sustaining-hook at the upper end and a dovetail groove in one side, and of a lower member $z'$ in the form of a wedge, arranged to slide in the groove in the upper member. The two parts are inserted in the line of matrices and form jointly an expansible spacer the thickness of which may be increased by sliding the lower member upward through the line alongside of its companion, the action in this respect being the same in principle as that of the spacers commonly used in the commercial Mergenthaler linotype-machine of the present day.

Passing now to the machine in which the matrices and spacers are employed its purpose is to sustain the various groups of matrices, release the individual matrices as indicated by the finger-keys and assemble them in a common line, adjust the individual matrices longitudinally to aline the selected characters, transfer this line to the casting mechanism, effect the justification of the line against the mold, supply the mold with molten metal to form the slug or linotype against the matrices, and, finally, return or distribute the matrices to the groups from which they started.

The matrices are suspended from a series of stationary guides or wires, along which they travel and on which they remain except at the time of presentation to the mold. Fig. 4 represents the general arrangement of these stationary guides on which the groups of matrices are normally suspended and held in reserve at the points indicated. It will be observed that the two bottom guides C C extend downward and forward from the points at which the matrices are suspended in converging lines until the space between them is just sufficient to admit the matrices. From this point they are continued forward and downward in parallel lines to the point 2 2 and thence with a sharper inclination to the point 3 3, whence they are continued downward and to the right and turn rearward and upward until they arrive at the point 4 4, where the casting mechanism is located. The guides $C'$ $C^2$, &c., lying at successively higher levels, also incline downwardly and forwardly in converging lines, their lower ends terminating directly over the bottom guides C and at a slight distance therefrom, as shown in Figs. 13 and 29, so that the matrices descending successively on the upper guides will have their eyes or hooks delivered therefrom to the bottom guides C C, upon and between which a series of matrices assembled or composed in line will be free to slide downward and forward. In other words, a matrix released on either of the guides will slide downward and forward by gravity until it finally passes between the bottom guides C C, on one or the other of which it will remain suspended. A series of matrices thus released and containing the characters to appear in a line of print will pass downward and forward between the guides C C.

Before presentation to the mold it is necessary that the longitudinal adjustment of the matrices shall be effected. This is accomplished, as shown in Figs. 4, 13, and 29, by short switches or guides D, lying above but normally to one side of the bottom guides C. There are two similar sets of switches, one for each side of the machine. Each switch consists of a short inclined wire or rod, which when moved laterally into operative position will form a junction with one of the adjacent guides C, so that a matrix descending on either of these guides will ride at its upper end on a switch, from which it will be suspended, so that as the matrix passes downward it will be sustained and carried to a guide-wire at a level higher than that at which it would have been carried on the bottom guide. The switches communicate with and deliver the matrices to stationary guides E, arranged in upright parallel banks or tiers, the number of these guides corresponding with the number of letters on one matrix. A matrix is delivered by the appropriate switch to one or another of the guides and carried thereby at a higher or lower level, according as one character or another of the matrix is required for use. If a character at the lower end of the matrix is demanded, the uppermost switch will be thrown into action and the descending matrix will be delivered to the uppermost guide, the effect of which will be to raise the bottom character to the alining or casting level. If, on the other hand, a character at a higher level on the matrix is demanded, the matrix will be switched onto a guide at the appropriate height. The result of this procedure will be to assemble the matrices side by side in a common line between the guides E at different heights or elevations, so that the designated characters will appear in a common line. After the line is thus assembled, suitable spacers being introduced at the proper points in the same manner that the matrices are introduced, the entire line is moved bodily downward between the guides and thence to the right and finally upward to the casting-point indicated in Fig. 4, their relative positions or adjustment vertically being maintained until after the slug is cast against them. After the casting action the matrices are released and permitted to drop until their lower ends stand at a common level. The upper ends of matrices belonging to different groups will of course stand at different levels or heights, as indicated in Fig. 4. The line is now carried upward and rearward and the eyes or ears of the matrices caused to engage over the fixed guides F, arranged at different levels and in two vertical tiers. These guides are continued upward and rearward and then continued downward, as shown at 5 5, Fig. 4, in diverging lines until they connect with the converging guides on which the matrix groups are stored. After the matrix-line has been carried upward and returned toward the front at the top of the machine the matrices will descend by gravity on the diverging guides and each matrix will join the group to which it originally belonged. This method of distributing the matrices by gravity on the diverging guides to the upper ends of the converging guides is essentially the same as in United States Patent to J. R. Rogers, No. 679,481.

Having thus described the general arrangement of guides for assembling the matrices, adjusting them longitudinally, and thereafter distributing them, I will now describe the details of the machine.

The stationary guides are all mounted in a rigid main frame A, which may be of any form and construction adapted to sustain the various operative parts. They consist, as shown more particularly in Figs. 8 and 10, of sections of wires of suitable length sustained and joined end to end by clips or plates $a$, which are in turn supported on upright rods $b$, forming part of the main frame and separated from each other by intervening washers or collars $c$. The ends of the clips or plates are bent upward and curled into tubular form. The ends of the wire or guide sections are reduced to form necks or tenons which are inserted into the tubular portion of the plates and secured therein after the manner of the guides in the Rogers patent before referred to. It will be observed that under this construction the sustaining-plates form continuations of the wires, so that a smooth unbroken surface is provided on which the eyes of the matrices may travel.

The groups of matrices are held at rest in the storage positions by escapements G, such as shown in Fig. 26, each consisting of two vertically-reciprocating dogs $g$ $g'$, pivoted at their upper ends to the opposite extremities of a lever $g^2$, which is mounted on a central pivot $g^3$ on a fixed bracket or support $g^4$. The dogs or pawls $g$ $g'$ are notched at their lower ends to straddle the guide-wire in advance of the matrices, whereby they are prevented from sliding downward. Normally the lower dog stands in front of the foremost matrix. When the actuating-lever is moved, the rear dog $g$ is pushed downward behind the foremost matrix to hold those lying in the rear, while at the same time the forward dog $g'$ is raised to permit the escape of the foremost matrix. The rising and falling motion of the two dogs alternately permits the matrices to slide one after another down the guide to the point of assemblage or composition.

The various escapements are connected each by a wire $g^5$ to a plate actuated by a finger-key H in the keyboard. Each of the finger-keys has two functions, first, that of operating the escapement to release the matrix bearing the selected character, and, second, to throw into action the appropriate switch D, that the matrix may pass to the line at such height as to present the selected character at the alining level. These results are accomplished by mechanism shown in Figs. $13^a$, $13^b$, and $13^c$. Each matrix contains ten characters. In the keyboard there are on each side five rows of keys extending from right to left, and in each row there are eight keys. In other words, there are on each side of the keyboard forty keys representing the forty matrix characters on that side of the machine. The two sides of the keyboard are built in duplicate, except that the parts are reversed right and left, and the following description of one side will answer for the other. Each of the switch-wires D in the one side of the keyboard is attached rigidly, as shown in Fig. $13^c$, to one end of a bar $d$, extending horizontally across the keyboard from side to side and free to move endwise a distance sufficient to throw the switch laterally into and out of its operative relation to the guide on which the matrices descend. Each of these bars $d$ is formed in the upper edge with a series of beveled lips $d'$ in position to be acted upon by all the finger-keys in one row from right to left. The finger-keys are each provided with a stem or spindle vertically guided in the frame and having at the lower end a beveled surface to act upon one of the lips $d'$ of one switch-bar. The keys in the transverse rows are arranged each to move the appropriate switch-bar $d$, so as to bring into action that switch which is necessary to arrest the released matrix at the proper height to bring into action the particular character represented by the key. Each key moves only one of the bars *d*. When, therefore, any one of the keys in the row is depressed to release a matrix, its lower end will push the bar *d* endwise and place the switch D in position to guide the down-coming matrix to the line at the proper height. All of the keys in two adjoining rows of five keys each, from front to rear of the keyboard, represent the ten different characters appearing on one matrix, so that the operation of any one of the keys in a row will release the same matrix. Each key will, however, at the time of its action set in position the corresponding switch to determine the height of the matrix, so that although the same matrix may be released by the different keys it will be adjusted at one height or another in the line, according to the letter represented by the key.

The operation of one escapement by the two rows of keys representing the various characters on one matrix is effected through the bars *h*, mounted to slide forward and backward in the keyboard-frame, one under each two rows of keys. The lower ends of the key stems or spindles are beveled, as shown in Figs. 13 and 13$^b$, to act on shoulders on the bar *h*. The upper end of this bar is connected to the escapement-operating wire $g^5$, before referred to, and the bar is drawn rearward and upward by the tension applied to this wire by the escapement-spring.

Whenever a finger-key is depressed, it serves to move the corresponding bar *h* forward, thereby operating the wire $g^5$ and the escapement at its upper end, so that a matrix is released and permitted to slide downward. At the same instant that this occurs the action of the key pushes the appropriate switch-bar and switch laterally in operative relation to the guide C, so that the down-coming matrix is carried onto the appropriate wire E and guided to the line at the proper height to present the selected character in operative position.

It will be seen that each finger-key serves, therefore, to release a matrix and set in motion the devices for determining the vertical adjustment of the matrix in the line, so that the operation of the keys in the proper order will result in the assemblage of a line or group of matrices with their designated characters, one in each matrix, in a common line, as shown in Figs. 4 and 5.

During the composition of a line the matrices are arrested and held in compact order by fingers I, projecting transversely between the guides, as shown in Figs. 6 and 7, these fingers being attached to a plate *i*, mounted on trunnions *i'*, so that it may be swung backward to withdraw the fingers from the path of the matrices after the composition of the line has been completed and preparatory to its transfer to the casting mechanism. The retraction of the plate *i* and its fingers is effected by an arm $i^2$ on a vertical rock-shaft $i^3$, provided with an operating-handle $i^4$ and serving also to trip the driving mechanism into action. The action of these restraining-fingers is supplemented by a lower finger J, pivoted at *j* and acted upon by a spring *j'*. This finger yields when the matrix-line is driven forward and then returns after the passage of the line to its original position. The advance of the line is effected, as in the Rogers patent before referred to, by a depending carrier-finger L, attached to an endless overhead chain N, passing through a fixed channel-guide M and around pulleys *n*. The finger L stands normally in the position shown in Fig. 3, out of the path of the matrices and above the place of composition. After the composition of the line is completed the chain is set in motion and the finger L pushes the line before it downward around the left-hand corner of the frame, thence across the front to the right, and finally rearward and upward along the guides E to the casting-point.

The casting mechanism is shown in Figs. 14, 15, 16, 19, 24, and 25. This casting mechanism consists principally of the plates O and P in rear of the matrices, the mold Q in front of the matrices, and the pot R in front of the mold to supply it with molten metal. The plate O is fixed in position on the frame and has across its lower edge, as shown, a lip adapted to enter one of the notches in the rear edge of each of the matrices in the line, so that as the matrix-line is moved forward to the casting position the plate engaging all the matrices serves to maintain their proper longitudinal adjustment. In other words, it maintains the alinement of the selected characters in the opposite edges of the matrices until after the casting operation. The second plate P, which is mounted in a slide *p* to move upward and downward, has its edge also adapted to enter the notches in the matrices and assist in insuring their exact alinement. The mold Q is mounted, as in the Rogers machine, on the upper end of an arm *q*, arranged to vibrate in a vertical plane for the purpose of bringing the mold in front of the matrices preparatory to the casting action, and thereafter swinging downward and forward to carry the mold in front of the ejector-blade S, Fig. 1, that the slug may be driven out of the mold into the galley. The ejector-blade reciprocates horizontally, as in the Rogers machine, being attached to and carried by a slide moving on a dovetail guide S', forming part of the main frame and represented in Figs. 1 and 17$^a$, these parts and the ejector-operating devices being the same as in the Rogers patent and forming no part of my invention.

The melting-pot R is provided, as usual in this class of machines, with a perforated delivery-mouth arranged to close tightly against the face of the mold and deliver the molten metal into the same against the matrices, the parts being in the relation shown in Fig. 25. The lower end of the pot is mounted on a horizontal axis to admit of its swinging forward and backward to and from the mold. The mold-arm $q$ has its horizontal shaft or pivot mounted to move endwise, so that the mold may be advanced tightly against the matrices prior to the casting operation and afterward retracted to withdraw the characters on the edge of the slug from the matrices.

After the casting operation it is necessary that the matrices shall be released, so that they may slide down endwise in relation to one another until their lower ends stand at a common level, so that their upper ends or eyes will stand at different heights, according to the length of the individual matrices, preparatory to their transfer rearward to the guide-wires, on which they travel back to the original storage-points. In order to release the matrices that they may be thus adjusted, the plates O and P are adapted to move forward and backward that their edges may be withdrawn from the notches in the matrices. This is effected as shown in Fig. 18. The plate O is slotted transversely to slide on fixed studs $o$, having collars or heads which enter the edges of the slots. These slots have an inclination longitudinally from the front toward the back of the plate, so that as the plate is moved to the right it will be pushed forward with its edge in position to enter the notches of the matrices. When pushed in the opposite direction, it will retreat and its edge will be carried beyond the matrices.

The plate P is connected to the slide $p$ by screws or studs $p'$, passing through angular slots $p^2$ in the plate. The lower or horizontal portions of the slots have an inclination from the front toward the back of the plate, and they are adapted to engage the heads of the screws $p'$. When the slide $p$ moves downward, the plate P remains at rest until the screws $p'$ reach the lower ends of the slots, after which the plate moves with the slide. On opposite sides the plate P is provided with beveled surfaces $p^3$ and $p^4$. As the slide completes its downward movement the projection $p^3$ encounters a fixed beveled stop-screw $p^5$, which acts to push the plate P to the left, whereupon the screws $p'$, acting in the horizontal portion of the slots, serve to move the plate bodily rearward, thereby drawing its upper edge out of engagement with the matrices. When the slide rises preparatory to the introduction of the next line of matrices, the action is reversed, and the plate P is again pushed forward to its operative position. The transverse movement of the plate O, before referred to, is effected by a beveled finger $o^2$ on the upper end of the slide $p$. After the two plates are disengaged from the matrices subsequent to the casting action the matrices move downward until their lower ends rest on the upper edge of a stationary cross-bar T, fixed to the frame. This downward movement of the matrices is insured, as shown in Fig. 24, by the upper edge of the plate P engaging over bottom lips on the rear edges of the matrices, whereby the matrices are pulled downward, as shown in Fig. 24, until they rest on the bar T.

The justification of the line is effected prior to the casting action by pushing the wedge-spacers Z upward through the line in the ordinary manner. This is accomplished by the slide U, mounted to move upward against the lower ends of the spacers and having at its upper end a lip $u^9$ to engage over the ears on the lower ends of the spacers for the purpose of pulling them downward after the casting action in order to loosen the matrices that they may descend to the required positions.

The matrix-line is confined sidewise to limit its extension during justification, as shown in Figs. 15 and 16, the construction being the same as in the Rogers patent. On the lower or rear side the line is supported by a transfer-finger L, which is in turn supported by a finger $l$, pivoted to the frame and supported under its rear end by the vibrating finger $l'$. On the upper side the line is confined by a shoulder $q^2$, projecting from the face of the mold Q. After the mold has been filled with molten metal and the slug formed therein the pot retreats from the mold and the mold retreats from the matrices, withdrawing its shoulder $q^2$ from their path, so that they may be moved rearward and upward along the guides for distribution. At this time the matrices are released and rearranged with their lower ends at a common level, as shown in Fig. 24. While they are in this position the transfer-finger L advances and pushes the line before it. The upper ends or eyes of the individual matrices pass onto the lower ends of the corresponding guides F, the shortest matrix passing onto the bottom guide, the longest onto the upper guide, and the others onto the intermediate guides, according to length. The guides F are continuations of the wires or guides from which the matrices were originally delivered. In other words, a matrix which is released from a guide at the storage-point passes to the line, thence to the casting mechanism, and finally upon the lower end of the same wire or guide. The finger pushes the entire line of matrices upward along the guides F and around their upper ends, whereupon the line is disintegrated, and the matrices passing down the respective wires rejoin at the storage-points the groups from which they were originally released.

Referring now to the details of the driving mechanism, the slide $p$ receives motion, as shown in Fig. 18, through a link $p^8$ from an angular lever $p^9$, actuated in turn by a lever $p^{10}$, which is lifted by a spring $p^{11}$ and depressed by a cam $p^{12}$. The justification-slide U is actuated through a link $u$ by an angular lever $u'$, which in turn receives motion from a lever $u^2$, controlled by a lifting-spring $u^3$ and a serrated depressing-cam $u^4$, whereby the slide is given repeated upward movements to drive the wedge-spacers into the line and in due time a downward movement to withdraw the wedges and hold them at rest. The overhead driving-chain N receives motion (see Figs. 1, 2, and 3) through the wheel $n$ on the upper end of a shaft which receives motion through intermediate pinions on the main driving-shaft, as in the Rogers patent. The main driving-shaft, its driving-clutch, and all the intermediate connections may be identical with those in the Rogers patent referred to. The melting-pot R (see Fig. 22) is mounted on a horizontal shaft $r$ and provided with an operating-arm $r'$ and is urged upward by a spring $r^2$ to throw the mouth back from the mold and depressed by the cam $r^3$, that serves to rock the pot forward and close its mouth tightly against its mold preparatory to the casting action. The mold-arm $q$ receives its rocking motion through the lever $q'$ and cam $q^2$. It receives its longitudinal motion through lever $q^3$, connected by link $q^4$ to the rocking-pot frame. All of these details and the other details of the driving mechanism may be identical with those in the Rogers patent or otherwise constructed at will, as they are not of the essence of my invention.

Having thus described my invention, what I claim is—

1. In a linotype-machine, the combination of a series of matrices, each having a plurality of separately-usable characters, a series of inclined converging guides whereon said matrices are suspended and held in storage, an inclined guide to which the matrices are delivered by the first-named guides for assemblage in line, a series of switches for diverting the individual matrices from the last-named guide at different heights, and means for retaining the matrices in position after they have passed the switches; whereby the matrices are assembled with their selected characters, one on each matrix, in a common line.

2. In a linotype-machine, the multiple-character matrices, each provided with a suspending-eye, in combination with the converging inclined guides whereon they are stored, the bottom guides to which the matrices are delivered by the first-named guides, switches D, to determine the height of the individual matrices as they pass to the line, and guides E, to maintain the matrices in their adjusted positions.

3. In a linotype-machine, a series of multiple-character matrices differing in length, a series of inclined guides whereon they are suspended, means for releasing the selected matrices, one at a time, that they may descend the respective guides, a bottom guide to which the released matrices are delivered by the first-named guides, means for assembling the released matrices in line and means for determining the longitudinal adjustment of the individual matrices in relation to others in the line; whereby the selected characters, one on each matrix, may be brought to a common line.

4. In a linotype-machine, a series of multiple-character matrices, an inclined guide to which matrices bearing the selected characters are delivered and from which they are suspended, and switches for diverting the individual matrices from said guide at different levels, according to the location of the particular characters selected for the line; whereby the matrices are adjusted longitudinally in relation to one another to bring the selected characters, one on each matrix, in alinement.

5. In a linotype-machine, a series of multiple-character matrices, inclined converging guides whereon they are suspended, escapement devices for releasing the individual matrices, a guide to which the released matrices are delivered from the converging guides, a series of switches for diverting the matrices from the last-named guide, at different levels, and a series of finger-keys, each connected with an escapement to release a matrix and also with a switch to determine the longitudinal adjustment of the matrix in the composed line.

6. In a linotype-machine, a series of multiple-character matrices, in combination with the converging guides C', C², &c., the receiving-guides C, C, continued downward in parallel lines, the parallel guides E, and switches for diverting the matrices to the guides E, at different heights.

7. In a linotype-machine, the series of multiple-character matrices, the guides C, C', &c., arranged in diverging and converging lines to effect the distribution and assemblage of the matrices, the parallel guides C, to which the matrices are delivered, escapements controlling the delivery of the matrices, switches to divert the matrices from the guides C at different heights, parallel guides E, to carry the composed and adjusted matrices to the casting mechanism, a casting mechanism, parallel guides F, extended thence upward and rearward, means for presenting the matrices to the casting devices and thereafter releasing them that they may assume a common level, and means for advancing the composed line to the mold and thence rearward to the point of distribution.

8. In a linotype-machine and in combination with the multiple-character matrices and escapements controlling their delivery, the guides C, C', C², &c., switches, parallel guides E, return-guides F, and means for advancing the composed line along the guides E and F, substantially as described.

9. In a linotype-machine and in combination with the multiple-character matrices and their escapements and guides, the switches to determine the height of the individual matrices in the line, the finger-keys H, and the bars $d$ and $h$, operated by the keys and connected respectively with the switches and escapements.

10. In a linotype-machine, the multiple-character matrices and guides E, from which the matrices are suspended in their adjusted relations, said guides terminating in advance of the mold, in combination with the mold, an alining-bar O, opposite the mold, to engage the matrices, and means for carrying the composed line of matrices from the guides E, into engagement with the bar O, whereby their adjusted relations are maintained as they are moved to the casting position.

11. In a linotype-machine, a series of multiple-character matrices, a series of guides E, from which the assembled matrices are suspended in their adjusted relations, means for carrying the line beyond said guides, an alining bar or plate O, engaging the matrices when advanced beyond the guides to maintain their adjustment during the casting operation, means for retracting this plate subsequent to the casting action to release the matrices, and means for thereafter bringing the matrices to a common level preparatory to their distribution.

12. In a linotype-machine and in combination with means for presenting the assembled and adjusted matrices thereto, an alining-plate O, to maintain the adjustment of the matrices, a second plate P, to bring the matrices to a common level subsequent to the casting action, and mechanism for engaging and disengaging the plate O, and for moving the plate P lengthwise of the matrices, substantially as described and shown.

13. In combination with the multiple-character matrices and means for presenting them in their assembled and adjusted relation, the bar T, the plates O and P, and means for operating said plates.

14. In a linotype-machine, a series of multiple-character matrices differing in length and provided with sustaining-eyes, in combination with means for presenting the assembled and adjusted matrices in the casting position, means for bringing the matrices to a common level subsequent to the casting action, a series of guides beyond the casting-point in position to receive the eyes of the matrices thus adjusted, and means for continuing the movement of the matrices to and along said guides for distribution.

15. The matrix for a linotype-machine, having at the top a suspending-eye, in one edge a series of characters, in the opposite edge corresponding notches, and at the lower end a toe protruding beyond the edge of the matrix-body.

In testimony whereof I hereunto set my hand, this 2d day of March, 1903, in the presence of two attesting witnesses.

PHILIP T. DODGE.

Witnesses:
JOHN F. GEORGE,
K. L. BRENNAN.